United States Patent [19]

Kano

[11] Patent Number: 4,990,208
[45] Date of Patent: Feb. 5, 1991

[54] METHOD OF MANUFACTURING AN OPTICAL RECORDING MEDIUM

[75] Inventor: Nobuhiko Kano, Nagano, Japan

[73] Assignee: Seiko Epson Corporation, a Japanese Corporation, Tokyo, Japan

[21] Appl. No.: 464,691

[22] Filed: Jan. 16, 1990

Related U.S. Application Data

[63] Continuation of Ser. No. 113,774, Oct. 28, 1987, abandoned.

[30] Foreign Application Priority Data

Oct. 31, 1986 [JP] Japan .................. 61-260254
Nov. 4, 1986 [JP] Japan .................. 61-262335
Oct. 1, 1987 [JP] Japan .................. 62-248832

[51] Int. Cl.$^5$ ............................... B32B 31/00
[52] U.S. Cl. .................. 156/275.3; 156/286; 156/291; 156/295
[58] Field of Search ............ 156/295, 275.3, 285, 156/286; 382, 291; 346/135.1, 137, 76 L; 360/135; 427/52, 54.1, 165, 208.6, 212, 240, 256, 262, 284, 286; 430/270; 428/64, 65

[56] References Cited

U.S. PATENT DOCUMENTS

| 3,132,967 | 5/1964 | Spraul et al. | 118/52 |
|---|---|---|---|
| 3,412,707 | 11/1968 | West | 118/212 |
| 3,607,528 | 9/1971 | Gassaway | 156/295 X |
| 4,210,462 | 7/1980 | Tourneux | 156/286 X |
| 4,267,212 | 5/1981 | Sakawaki | 427/240 |
| 4,292,109 | 9/1981 | Becker | 156/285 X |
| 4,316,757 | 2/1982 | Walsh | 156/286 |
| 4,331,494 | 5/1982 | Duchateau et al. | 156/286 X |
| 4,416,213 | 11/1983 | Sakiya | 118/52 |
| 4,431,471 | 2/1984 | Mertens et al. | 156/286 X |
| 4,440,586 | 4/1984 | Lippits et al. | 346/137 X |
| 4,449,138 | 5/1984 | Ando | 346/135.1 |
| 4,450,452 | 5/1984 | Ando et al. | 346/135.1 |
| 4,492,718 | 1/1985 | Mayer et al. | 427/164 X |
| 4,583,102 | 4/1986 | Tamura et al. | 346/135.1 |
| 4,592,939 | 6/1986 | Temple et al. | 428/65 X |
| 4,610,903 | 9/1986 | Nomura et al. | 428/64 |
| 4,620,989 | 11/1986 | Stiegler | 118/262 |
| 4,629,668 | 12/1986 | Hamersley et al. | 346/137 X |
| 4,635,076 | 1/1987 | Willson et al. | 346/135.1 |
| 4,686,543 | 8/1987 | Tani et al. | 430/270 X |
| 4,731,620 | 3/1988 | Yabe et al. | 346/137 |
| 4,760,012 | 7/1988 | Mochizuki et al. | 346/137 X |
| 4,792,474 | 12/1988 | Murakami et al. | 346/135.1 X |

FOREIGN PATENT DOCUMENTS

| 116025 | 3/1983 | Japan . |
| 20337 | 2/1985 | Japan . |
| 193144 | 10/1985 | Japan . |
| 50232 | 3/1986 | Japan . |

OTHER PUBLICATIONS

Kowalski et al., "Multichannel Digital Optical Memory System," *Optical Eng'g* vol. 22, No. 4, pp. 464-472, (Jul. 1983).

Primary Examiner—Michael W. Ball
Assistant Examiner—Mark Osele
Attorney, Agent, or Firm—Blum Kaplan

[57] ABSTRACT

An optical recording medium and a method for manufacturing an optical recording medium from a first substrate having a first surface and a second substrate having a second surface facing the first surface of the first substrate. At least one of the first and second substrates includes an information recording layer. An adhesive material is selectively applied to one of the first and second surfaces. The first surface of the first substrate is then positioned in close facing engagement with the second surface of the second substrate, and the first and second substrates are adhered under predetermined partial vacuum conditions. Preferred materials, adhesives, viscosity of the adhesives, pressures for adhering the substrates, and degree of vacuum are disclosed.

33 Claims, 12 Drawing Sheets

FIG. 7
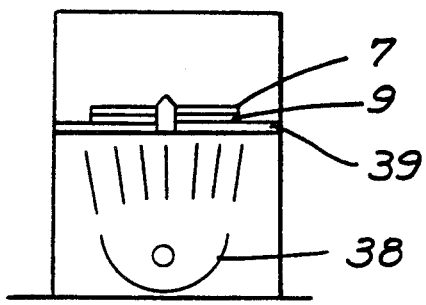
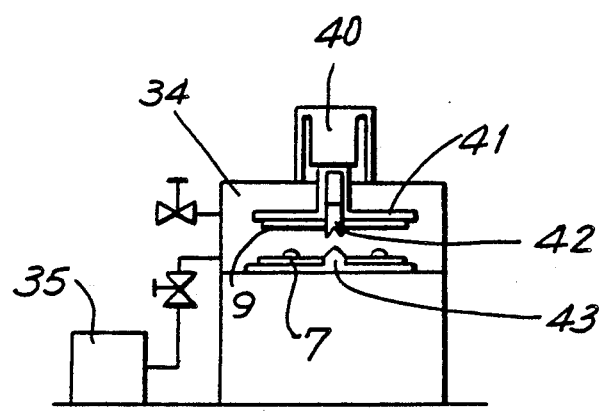
FIG. 8

FIG. 9
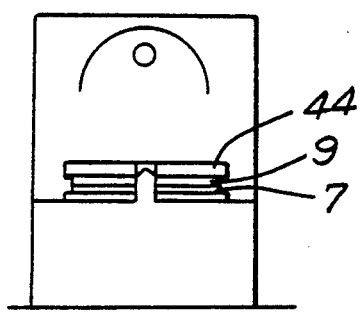
FIG. 10
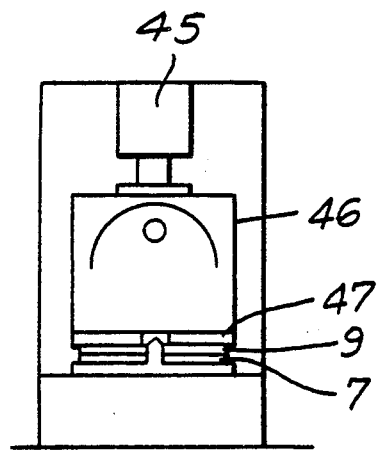
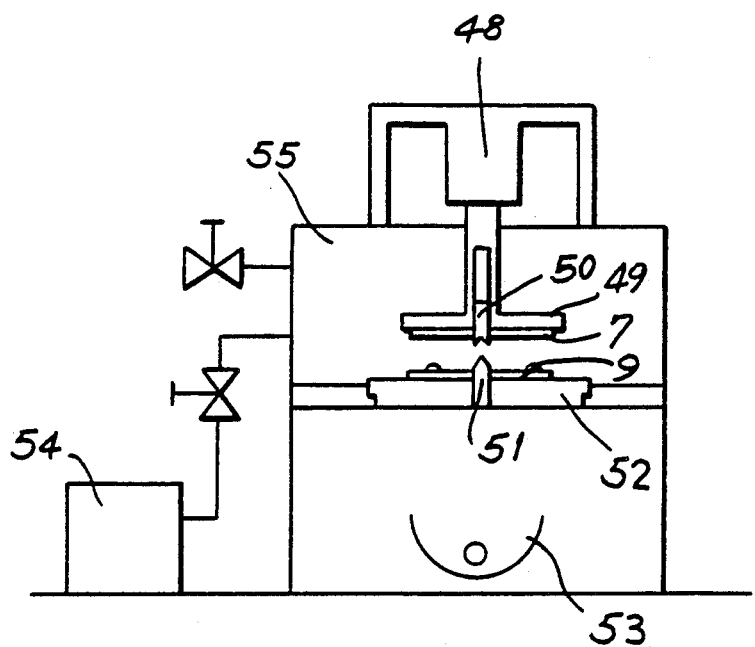
FIG. 11

FIG. 14
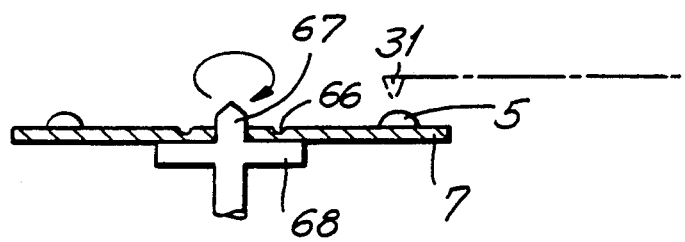
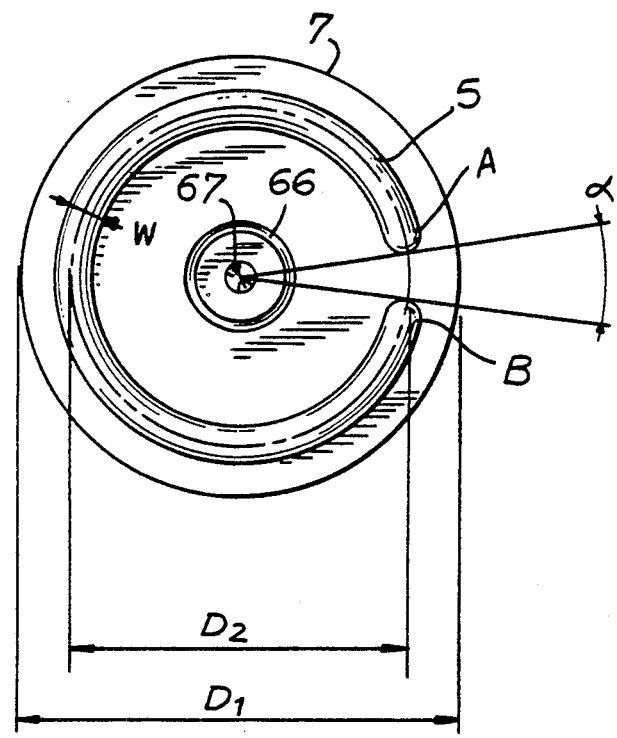
FIG. 15

FIG. 21
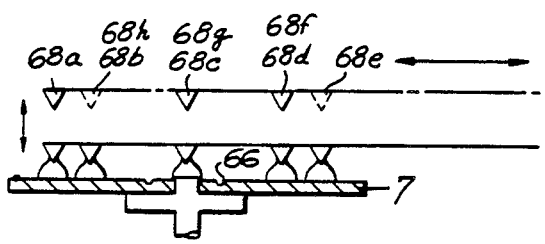
FIG. 23A
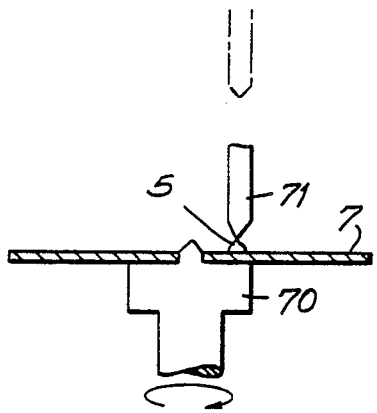
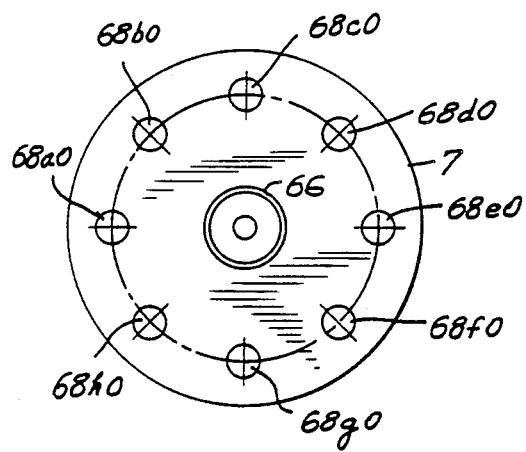
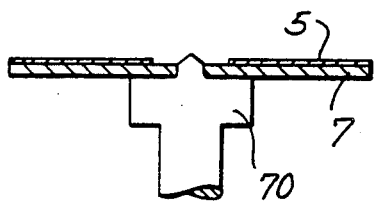
FIG. 22
FIG. 23B $t_0 \approx t_1 \approx t_2.$

METHOD OF MANUFACTURING AN OPTICAL RECORDING MEDIUM

This is a continuation of application Ser. No. 07/113,774, filed Oct. 28, 1987, now abandoned.

BACKGROUND OF THE INVENTION

This invention relates generally to an improved method for the manufacture of an optical recording medium on which information can be read or written by a laser beam and the optical recording medium produced by such method. In particular, the improved method of the present invention involves the adhering together of first and second substrates, at least one of which includes an information recording layer, under partial vacuum conditions.

Generally, a conventional optical recording medium (ORM) includes an information recording layer disposed intermediate first and second substrates. To construct such a conventional optical recording medium, the information recording layer is formed on one of the first or second substrates, an adhesive material is applied to the surface of one of the substrates and then the other substrate is pressed against the adhesive on the first substrate to bond the substrates together. Conventional methods use a rollcoater or sprayer to apply the adhesive under normal atmospheric pressure. Force is then applied to press the substrates together under normal atmospheric pressure to insure that a proper bond is formed.

Reference is made to FIG. 31 of the drawings which illustrates the conventional method for manufacturing an optical recording medium using a first substrate 91 and a second substrate 93. An adhesive layer 92 is applied intermediate first substrate 91 and second substrate 93. Force is then applied to press the substrates together by a weight 90 under normal atmospheric pressure to insure proper contact. When an optical recording medium is constructed in this manner, air bubbles are inevitably formed in adhesive layer 92 thereby causing defects in the optical recording medium and producing errors in the information read from the information recording layer. Additionally, the air bubbles in the adhesive layer cause the dielectric layer, which is used to protect the information recording layer, to crack thereby causing burst errors and bit errors.

When force is used to adhere the substrates and to improve dimensional accuracy, it is very difficult to apply the force uniformly across the entire substrate. Non-uniform force causes birefringence in both the substrates and the adhesive layer. Additionally, dust on the pressing plate is forced against the substrate surface thereby causing defects such as unevenness in the substrate surfaces.

Another conventional method for producing substrates includes the use of injection molded plastic base substrates as shown in FIG. 32. Such base substrates have variations in the length and in the thickness of the outer periphery of the substrates. When such injection molded substrates are adhered together with force, surface deflection and warp of the adhered substrates tends to be greater than it is in a single substrate.

Due to these problems, conventional construction methods will not produce a high quality optical recording medium with a high yield. Accordingly, it is desired to provide an improved optical recording medium and an improved method for manufacturing an optical recording medium.

SUMMARY OF THE INVENTION

Generally speaking, in accordance with the present invention, an optical recording medium and a method for manufacturing an optical recording medium from a first substrate having a first surface and a second substrate having a second surface facing said first surface are provided. At least one of the first and second substrates include an information recording layer. An adhesive material is selectively applied to one of the first and second surfaces. The first surface of the first substrate is then moved into close facing engagement with the second surface of the second substrate and the first and second substrates are adhered under predetermined partial vacuum conditions.

Several different embodiments and examples of the manufacturing method and product are set forth in detail hereinafter. Preferred materials, adhesives, viscosity of the adhesives, pressures for adhering the substrates, degree of vacuum and the like are also disclosed in detail below.

Accordingly, it is an object of the present invention to provide an improved optical recording medium and a method of manufacturing same wherein air bubbles which can cause cracks, bit errors and burst errors are essentially eliminated from the adhesive used to adhere the substrates used to form the optical recording medium.

Another object of the invention is to provide an optical recording medium with less warp and deflection of the substrates.

Yet another object of the invention is to provide an optical recording medium with fewer defects.

A further object of the invention is to improve the manufacturing yield of high quality optical recording media.

A still further object of the invention is to improve the initial error rates of optical recording media.

Yet still another object of the invention is to improve the long term reliability of optical recording media.

Still other objects and advantages of the invention will in part be obvious and will be in part apparent from the specification.

The invention accordingly comprises the several steps and the relation of one or more of such steps with respect to each of the others, and the article possessing the features, properties, and the relation of elements, which are exemplified in the following detailed disclosure, and the scope of the invention will be indicated by the claims.

BRIEF DESCRIPTION OF THE DRAWINGS

For a fuller understanding of the invention, reference is had to the following description taken in connection with the accompanying drawings, in which:

FIGS. 6 and 7 are schematic diagrams of an apparatus for exposing the affixed substrates to ultraviolet light to cure the adhesive;

FIG. 8 is a schematic diagram of an alternative apparatus for affixing the substrates under vacuum conditions;

FIGS. 9 and 10 are schematic diagrams of an apparatus for exposing the substrates to ultraviolet (UV) radiation while the substrates are moved together under pressure;

FIG. 11 is a schematic diagram of an apparatus in which the substrates are adhered together in a vacuum and in which UV rays are applied;

FIG. 14 is a cross-sectional view of a substrate on which a ring of adhesive is applied;

FIG. 15 is a top plan view of a substrate on which a ring of adhesive is applied;

FIG. 21 is a cross-sectional view of a substrate positioned on a center boss illustrating the method of dispensing a dotted adhesive in a concentric circle;

FIG. 22 is a top plan view of a substrate on which adhesive is applied in a dotted pattern in a concentric circle;

FIGS. 23A and 23B are cross-sectional views illustrating the spin coating method of applying adhesive;

DETAILED DESCRIPTION OF THE PREFERRED EMBODIMENTS

Figure 1:
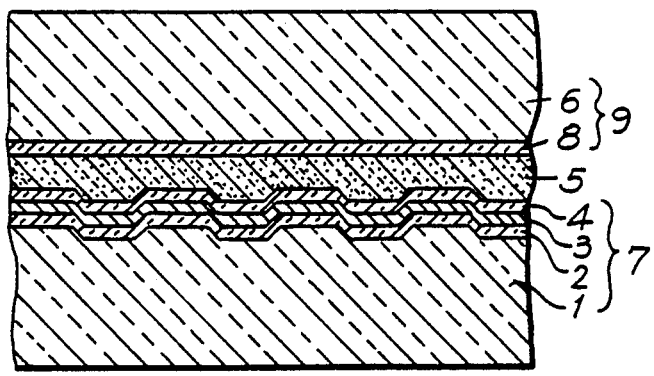
FIG. 1 is a cross-sectional view taken through an optical recording medium constructed in accordance with a first embodiment of the present invention.

Before turning to the drawings and detailed discussion of relevant examples, a general discussion of the invention will be presented. An optical recording medium constructed in accordance with the present invention is prepared by adhering together first and second substrates under vacuum conditions.

The first and second substrates are constructed to provide the necessary optical properties. An information recording layer is disposed on the first base substrate which can be protected with the application of a layer of dielectric material to form the first substrate.

To manufacture an optical recording medium from the first and second substrates according to the invention, an adhesive material is applied to one of the substrates, the other substrate is moved into position under partial vacuum conditions, and the adhesive is cured. Better quality optical recording media are produced when limited pressure is applied to force the first and second substrates together before and while the adhesive cures.

The first and second base substrates are preferably constructed of a material with appropriate optical properties. Examples of materials with excellent optical properties include polycarbonate, PMMA, epoxy, TPX or glass.

The selection of the adhesive can affect the quality of the product produced. The adhesive should have a viscosity between about 0.5 and about 10,000 cps. However, if the viscosity is greater than about 1,000 cps, the diffusion properties of the adhesive become less appropriate and the incidence of air bubbles trapped between the substrates increases. If the viscosity of the adhesive is below about 4 cps, the adhesive can penetrate through pin-holes into the recording layer. This increases the bit error rate. Therefore, the adhesive should have a viscosity of between about 4 and about 1,000 cps.

Various types of adhesives can be used. Besides the preferred UV curing type adhesive, anaerobic curing adhesive, cyanoacrylate series adhesive, two-pack type epoxy series adhesive, and two-pack urethane series adhesive can also be used. If an anaerobic adhesive or a UV curing adhesive with anaerobic properties is used, it is preferable to use dotted or layer-shaped catalysts for accelerating the anaerobic curing properties. These catalysts should be applied onto the substrate surface that gets coated with adhesive. Examples of such catalysts include metals such as Fe, Cu, Zn, or Al or alloy metals containing at least one of these metals. In fact, such adhesives can be cured by a combination of heat, moisture, UV rays, or anaerobic atmosphere. Any of these curing methods or combination of methods can be used.

If UV curing adhesive is used, the energy of irradiation should be about at least 100 mj/cm$^2$ to initiate polymerization quickly. When the energy of irradiation is less than 100 mj/cm$^2$, the polymerization reaction is unstable and there is an increased fluctuation of the solid state properties of the adhesive material. Therefore, it is preferred that the energy of irradiation be greater than 100 mj/cm$^2$.

The first and second substrates should be adhered while in a chamber having a vacuum degree between about 100 torr and $1 \times 10^{-4}$ torr. The preferred range is between about 30 torr and $5 \times 10^{-3}$ torr. If the pressure in the chamber is above 30 torr, there is an increased possibility that air bubbles will form in the adhesive. When the pressure is less than about $5 \times 10^{-3}$ torr, the adhesive can begin to vaporize.

Figure 2:
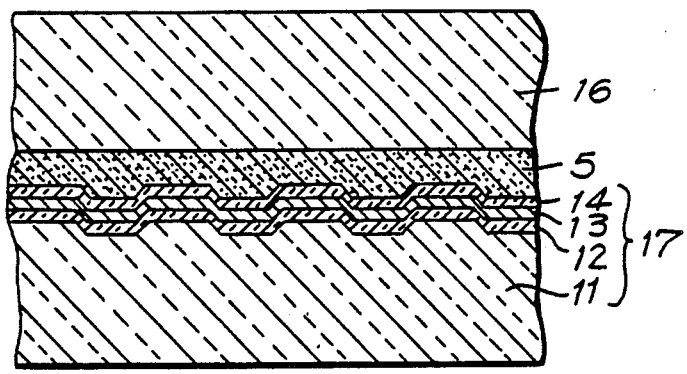
FIG. 2 is a cross-sectional view taken through an optical recording medium constructed in accordance with a second embodiment of the present invention.

The choice of structural characteristics of the optical recording disk further narrows the preferred vacuum degree range. For example, as shown in FIG. 1 as described in detail below, dielectric materials 8 and 2 are placed between adhesive 5 and plastic base substrates 1 and 6. However, as shown in FIG. 2 and described in detail below, upper plastic substrate 16 is exposed. Gas can be emitted from the uncoated plastic substrate 16 which interferes with the uniformity of the wetting properties between plastic substrate 16 and adhesive 5. Therefore, these two different structures require different degrees of vacuum when the substrates are affixed. In FIG. 2, where there is no dielectric material between plastic substrates 16 and the adhesive, the preferred pressure range in the chamber is lower, between 10 torr and $5 \times 10^{-3}$ torr or less rather than the 30 torr to $5 \times 10^{-3}$ torr range preferred for the structure illustrated in FIG. 1.

Equivalent results are obtained whether the adhesive is applied under atmospheric conditions before the two substrates are joined together and whether the entire procedure takes place in a partial vacuum. For example, there is no difference in bit error rate or burst errors caused by air bubbles. Adhesive does not squeeze out of the center opening or the outer edge of the optical recording media constructed by either method. Dimensional accuracy, such as surface deflection, is similar in media constructed by both methods. However, it is easier to control the stability of the adhesive dispenser and maintain the apparatus when adhesive is applied under normal atmospheric conditions.

Although whether or not adhesive is applied in a partial vacuum does not affect product quality, the different methods for applying the adhesive to the substrate can affect the quality and manufacturing yield of the optical recording medium. Such methods are not all as effective in keeping air bubbles out of the adhesive layer or the interface of the adhesive layer and the substrate. The two methods which work best are the ring shaped adhesive application method and the dotted ring adhesive method. These methods minimize the probability of air bubbles forming in the adhesive or in the interface of the adhesive layer than the spin coating method, roll coating method, and screen printing method.

A range of pressures can be applied to press the two ORM substrates together to insure proper adherence of the two substrates. In fact, when the lower substrate is laid flat, adhesive applied to its top surface, and the upper substrate is placed upon it, the weight of the top substrate alone can exert sufficient pressure. The most external pressure that should be applied to press the substrates together is about 10 kg/cm². However, superior products are produced when the pressure exerted is in the range between the pressure exerted by the upper substrate due to gravity and about 1 kg/cm². When lighter pressures are used, there is less chance that adhesive will be forced out from the external or inner edge of the ORM disc. Additionally, when less pressure is used, neither the dielectric layer nor the recording layer proximate pin-holes of the optical recording layer are destroyed.

The present invention will now be explained in detail with reference to the following examples. These examples are presented for purposes of illustration only and are not intended to be construed in a limiting sense.

EXAMPLE 1

FIG. 1 is a cross-sectional view of a disc shaped optical recording medium constructed in accordance with the present invention. The optical recording medium includes a first base substrate 1 formed from polycarbonate having a thickness of 1.2 mm. Base substrate 1 includes grooves with a pitch of 1.6 μm, a width of 0.8 μm and a depth of 650 Å on the surface of base substrate 1. Dielectric layers 2 and 4 on base substrate 1 are formed of silicon nitride and have a thickness of 1000 Å. A magneto-optic recording layer 3 of Tb-Fe-Co alloy and having a thickness of 800 Å is formed on base substrate 1. The entire lower or first substrate, designated generally at 7, includes the following layers: polycarbonate base substrate 1, silicon nitride layer 2, magneto-optic recording layer 3, and silicon nitride layer 4.

Upper polycarbonate base substrate 6 has a thickness of 1.2 mm. A silicon nitride layer 8 having a thickness of 1000 Å is formed on substrate 6 as depicted. The entire upper or second substrate 9 includes polycarbonate base substrate 6 and silicon nitride layer 8. Second substrate 9 is adhered to first substrate 7 with a UV curing-type adhesive layer 5.

Figure 4:
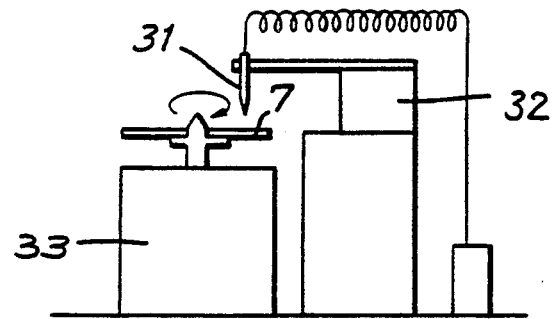
FIG. 4 is a schematic diagram of an apparatus for dispensing adhesive used in conjunction with the manufacturing method of the present invention.
Figure 5:
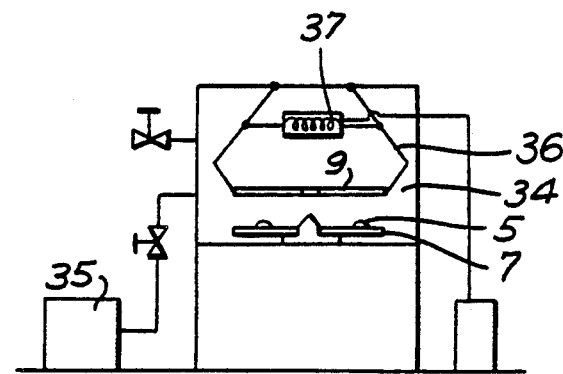
FIG. 5 is a schematic diagram of an apparatus for adhering first and second substrates under vacuum conditions to form an optical recording medium.
Figure 6:
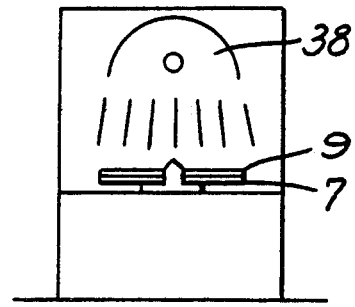

The method used to prepare this optical recording medium of FIG. 1 is illustrated in FIGS. 4 through 6 of the drawings. FIG. 4 is a schematic diagram of an adhesive dispensing apparatus which illustrates one method of dispensing the adhesive in this example. A dispenser nozzle 31 is moved to a predetermined position above substrate 7 by a horizontal positioning unit 32. A UV curing-type adhesive is applied to substrate 7 through dispenser 31. While the adhesive is applied, motor 33 rotates substrate 7.

FIG. 5 is a schematic representation of an apparatus for placing first and second substrates 7 and 9 together under partial vacuum conditions. UV curing type adhesive 5 is applied to the upper surface of substrate 7 by the device shown in FIG. 4. Substrate 7 is then placed into a vacuum chamber 34. A vacuum pump 35 lowers the pressure in vacuum chamber 34 to $1 \times 10^{-1}$ torr. Then, an electromagnetic switch 37 is activated to release second substrate 9 from a frame 36 which positions second substrate 9 on first substrate 7. The weight of second substrate 9 is the only force used to press first and second substrates 7 and 9 together.

FIG. 6 is a schematic illustration of an apparatus for exposing first and second substrates 7 and 9 to ultraviolet radiation to cure adhesives. Substrates 7 and 9 are joined together in a vacuum chamber and then placed under an UV source 38 under atmospheric conditions. Exposure of adhesive 5 to UV rays from above completely cured UV curing-type resin 5. In this Example, UV source 38 is a high pressure mercury vapor lamp rated at 2 KW and manufactured by Berkey Technical Co.

The optical recording media constructed by this method did not have air bubbles in the adhesive layer or at the interface between the adhesive layer and the dielectric layer. The dielectric layer and the recording layer portions near to pinholes of a recording layer portion were not destroyed at all. Burst errors caused by air bubbles in the adhesive layer were eliminated. The bit error rate was at most $4 \times 10^{-6}$ defects per bit. Additionally, the surface deflection of a single substrate was 70 μm, but it was improved to 35 μm after the substrates were adhered.

EXAMPLE 2

UV rays can be applied from below to cure the adhesive. FIG. 7 depicts an apparatus which exposes the joined substrates to UV-rays from below, through a plate 39. To construct an optical recording disk as shown in FIG. 1, a UV curing adhesive is first applied to second substrate 9 under atmospheric conditions as shown in FIG. 4. Then, first substrate 7 is affixed to second substrate 9 in a partial vacuum as shown in FIG. 5. The joined substrates are then placed on plate 39 of FIG. 7. Finally, the UV curing-type adhesive was cured completely by exposing the substrates to UV rays from below under normal atmospheric conditions as shown in FIG. 7. Air bubbles were absent from the adhesive layer, and the interface of the adhesive layer, and a dielectric layer and a recording layer near to pinholes of a recording layers portion were not destroyed at all. Burst errors caused by air bubbles in the adhesive layer were eliminated. The bit error rate was $3 \times 10^{-6}$ defects per bit. The surface deflection in a single substrate was 80 μm, but after the substrates were adhered, the surface deflection was improved to 30 μm. In addition, because the adhesive was initially applied to substrate 9 which has no recording layer, penetration of the adhesive through pinholes into the recording layer was decreased as much as possible.

EXAMPLE 3

FIG. 2 is a cross-sectional view of an optical recording medium which is constructed without a dielectric layer between the bottom surface of second polycarbonate substrate 16 and adhesive layer 5. Polycarbonate substrate 16 has a thickness of 1.2 mm. First polycarbonate base substrate 11 has a thickness of 1.2 mm and its upper surface has grooves with a pitch of 1.8 μm, a width of 0.6 μm, and a depth of 670 Å. Dielectric layers 12 and 14 were made from a composite of silicon nitride and aluminum nitride and have a thickness of 800 Å. Magneto-optic recording layer 13 is formed from a Nd-Dy-Fe-Co-Ti alloy layer and has a thickness of 800 Å. The entire lower substrate 17 includes polycarbonate base substrate 11, silicon nitride-aluminum nitride composite, dielectric layers 12 and 14, and magneto-optic recording layer 13.

Second Substrate 16 is adhered to first substrate 17 with UV curing-type adhesive 5 in essentially the same manner as in Example 1 to form an optical recording medium. Optical recording media constructed in this manner had a bit error rate of $4 \times 10^{-6}$ defects per bit and the surface deflection was 40 μm.

EXAMPLE 4

FIG. 8 is a schematic illustration of an apparatus for affixing the first and second substrates under partial vacuum conditions in which pressure can be applied to force the two substrates together. Substrate 9 is held on a pressing plate 41 by a holding unit 42. Pressing plate 41 has a smooth surface. Substrate 7 is coated with an UV curing-type adhesive in essentially the same manner as in Example 1 and is then placed over a center-boss 43 inside a vacuum chamber 34. The pressure within vacuum chamber 34 is decreased by vacuum pump 25 until it reaches $2 \times 10^{-2}$ torr. Substrate 9 is then lowered by air cylinder 40. When holding unit 42 contacts center boss 43, substrate 9 is released and it contacts substrate 7. In this example, the only force used to press substrate 9 onto substrate 7 was the weight of substrate 9. No external pressure was applied to force the two substrates together. However, pressure from air cylinder 40 could have been used to add additional pressure.

Products constructed in this manner did not have air bubbles in the adhesive layer nor in the interface adjacent to the adhesive layer and a dielectric layer and a recording layer near to pinholes of a recording layer portion were not destroyed at all. The lack of air bubbles eliminated burst errors. The bit error rate was $4 \times 10^{-6}$ defects per bit. The amount of surface deflection of a single substrate was 70 μm, while after the substrates were adhered, the surface deflection was decreased to 35 μm.

EXAMPLE 5

FIGS. 9 and 10 are schematic illustrations of devices which expose the substrates to UV rays while the two substrates are being pressed together. In FIG. 9, the weight of a quartz glass plate 44 is used to supply pressure for forcing substrate 7 and substrate 9 together. In FIG. 10, quartz glass plate 47 rests on the substrates 7 and 9 but additional pressure is supplied to squeeze the two substrates together. An UV lamp unit 46 is coupled to a pressure cylinder 45. Pressure cylinder 45 moves UV lamp unit 46 up and down and can supply additional pressure to force the two substrates together.

Optical recording disks of the type illustrated in FIG. 1 were produced essentially by the method of Example 1 but extra pressure was added to the affixing step by apparatuses illustrated in FIGS. 9 and 10. As the force pressing the substrates together was increased, the quality of the ORMs which were produced decreased. High pressures force adhesive out of the center opening and out of the extended edge and pinhole portions of the substrate near to the recording layer of substrate were destroyed. The results of this example are summarized in Table 2 which appears at the end of the specification.

EXAMPLE 6

FIG. 11 is a schematic illustration of an apparatus which will adhere the two substrates under vacuum conditions as well as expose the substrates to UV rays. Adhesive is applied to substrate 9 under normal atmospheric conditions. The substrates are then placed in a vacuum chamber 55. Substrate 7 is held on a pressing plate 49 by a holding unit 50. Substrate 9 is placed over a center-boss 51, and onto a quartz glass plate 52. After vacuum pump 54 lowers the pressure in vacuum chamber 55, a pressure cylinder 48 lowers substrate 7 onto substrate 9. When holding unit 50 contacts center-boss 51, substrate 7 is released. Substrate 7 can be forced against substrate 9 by additional pressure supplied by pressure cylinder 48 and pressing plate 49. The joined substrates are then exposed to UV rays from a UV source 53. Optical recording media shown in FIG. 1 were constructed in this manner. As noted above, it is best to force the two substrates together with as little pressure as feasible. Results from this method are similar to the results from Example 5 and are also summarized in Table 2 below.

EXAMPLE 7

Figure 12:
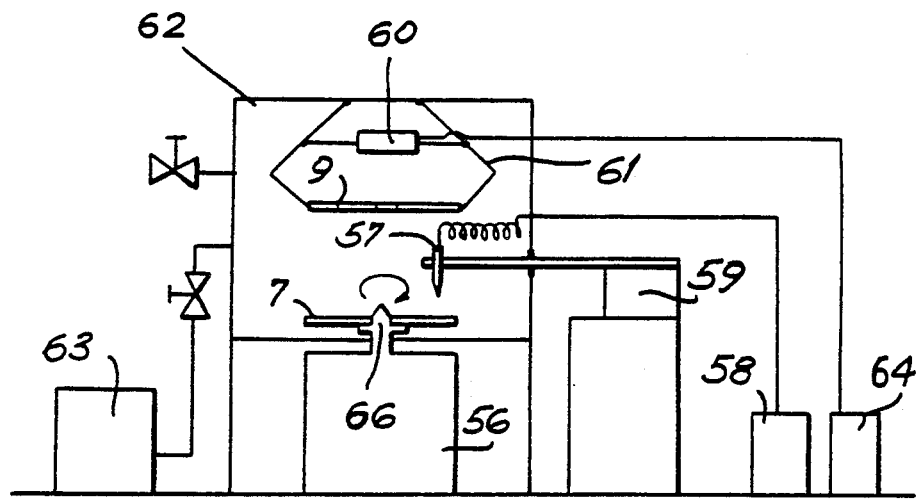
FIGS. 12 and 13 are schematic diagrams of an apparatus in which the adhesive is applied by a dispensing device and the two substrates are affixed under vacuum conditions with ultraviolet radiation.

FIG. 12 is a schematic illustration of an apparatus for manufacturing optical recording media with structural characteristics illustrated in FIG. 1. Substrate 7 is placed on turntable 66 and substrate 9 is placed in a frame 61. A vacuum pump 63 lowers the pressure in vacuum chamber 62 to $1 \times 10^{-1}$ torr. UV curing-type adhesive from a dispensing unit 58 is then applied to substrate 7 from a dispenser nozzle 57 which is moved into position by a horizontal positioning unit 59. While adhesive is being dispensed from dispenser 57, substrate 7 is rotated by a rotating motor 56. After adhesive is applied and dispensing nozzle 57 is moved out of the way, a controlling unit 64 causes an electromagnetic switch 60 to move frame 61 so that substrate 9 contacts substrate 7. The weight of substrate 9 alone was used to press it onto substrate 7. Finally, the adhesive was cured by the method illustrated in FIG. 6.

ORMs constructed in this manner did not have air bubbles in the adhesive layer nor in the interface of the adhesive layer. The recording layer near to pinholes of a recording layer portion was not destroyed at all. The bit error rate was $4 \times 10^{-6}$ defects per bit. Burst errors caused by air bubbles in the adhesive layer were eliminated. The amount of surface deflection of a single substrate was 70 μm while the surface deflection after the two substrates were joined was 35 μm. The warp of the substrates was also greatly reduced.

EXAMPLE 8

Figure 13:
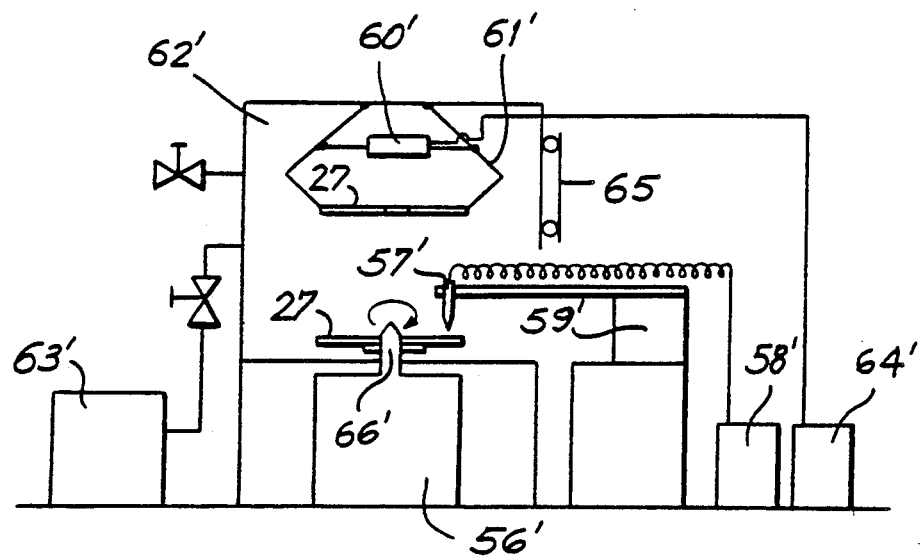

FIG. 13 is a schematic illustration of an apparatus for joining together the two substrates of an optical recording medium. The unit is essentially similar to the unit illustrated in FIG. 12 except that a gate valve 65 is provided so that an adhesive dispensing nozzle 57' can move into and out of a vacuum chamber 62'. To prepare an optical recording medium with the symmetric structure of FIG. 3, gate valve 65 is opened, then horizontal positioning unit 59' moves dispensing nozzle 57' into vacuum chamber 62'. Adhesive from the dispensing unit 58' flows through adhesive dispenser nozzle 57' onto lower substrate 27. Lower substrate 27 is then rotated by rotating motor 56' so that a ring of adhesive is applied to the surface of lower substrate 27. After the adhesive is applied, horizontal positioning unit 59' removes dispenser nozzle 57' from vacuum chamber 62' and gate valve 65 is closed. Thereafter, vacuum chamber 62' is evacuated. When the pressure decreases to $5 \times 10^{-2}$ torr, upper substrate 27 is lowered onto lower substrate 27.

Figure 3:
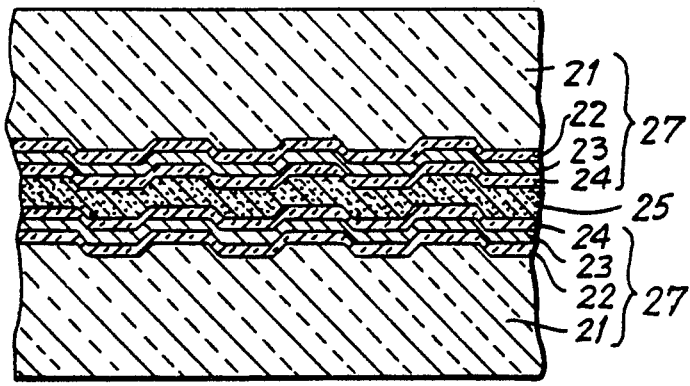
FIG. 3 is a cross-sectional view taken through an optical recording medium constructed in accordance with a third embodiment of the present invention.

Polycarbonate base substrate 21 as shown in FIG. 3 has a thickness of 1.2 mm and grooves on one side with a pitch of 1.6 μm, a width of 0.6 μm and a depth of 700 Å. Dielectric layers 22 and 24 are composite layers formed from silicon nitride and aluminum nitride and having a thickness of 800 Å. Magneto-optical recording layer 23 is a Tb-Fe-Co alloy with a thickness of 450 Å. Upper substrate 27 includes the combination of polycarbonate base substrate 21, dielectric layers 22 and 24 and magneto-optical recording layer 23. An UV curing-type adhesive 25 is used to adhere the two substrates 27 and 27 together.

The discs constructed in this manner had no air bubbles in the adhesive layer or in the interface of the adhesive layer. There is no destruction of the dielectric layer or the recording layer near to pinholes of the recording layer portions. The bit error rate was $2 \times 10^{-6}$ defects per bit and burst errors caused by air bubbles in the adhesive were eliminated. The surface deflection of a single substrate was 60 μm but after the substrates were adhered together, the surface deflection was reduced to 25 μm. The warp of the substrates was also greatly reduced.

EXAMPLE 9

It is an important aspect of the present invention to apply an even coating of adhesive to the substrate. FIG. 14 is a schematic illustration of an apparatus used to apply an even coat of adhesive to a substrate and shows a substrate 7 resting on a turntable 68 centered about a center-boss 67. Adhesive 5 is applied to substrate 7 in a ring shape by a dispenser 31. FIG. 15 is a top plan view of adhesive 5 distributed on substrate 7 in a ring shape.

Adhesive is applied to substrate 7 by positioning the dispenser over the position designated by A. The substrate is then rotated about center-boss 67 such that adhesive 5 is dispensed onto substrate 7 in a ring shape terminating at position B. The angle of separation α between the two ends of the nearly completed ring should be 25° or less. The ratio of the diameter of the adhesive ring ($D_2$) to the diameter of the substrate ($D_1$) should be 0.6 or more, ($D_2/D_1 \geq 0.6$). In other words, position A should be at least 6/10 the distance from the center of the disc to the edge of the disc. Further, the shape of the adhesive at position A should be approximately the same as at position B. If these characteristics are not achieved, the adhesive will inevitably squeeze out from between the two substrates or spread over a groove 66 which holds the internal stamper, and into the center-boss of the turntable. If adhesive is continuously squeezed out while discs are produced, the vacuum chamber becomes unacceptably dirty and the optical recording media will be optically distorted.

Figure 16A:
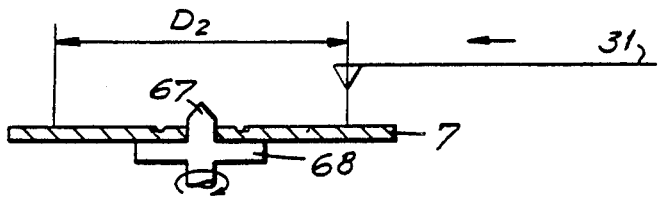
FIGS. 16A through 16E are cross-sectional views illustrating the steps followed in applying a ring of adhesive to the substrate.
Figure 16B:
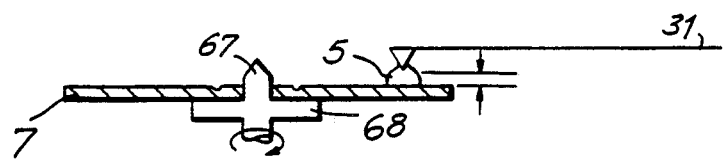
Figure 16C:
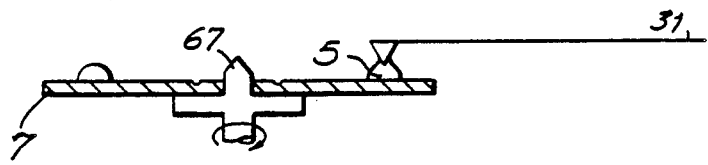
Figure 16D:
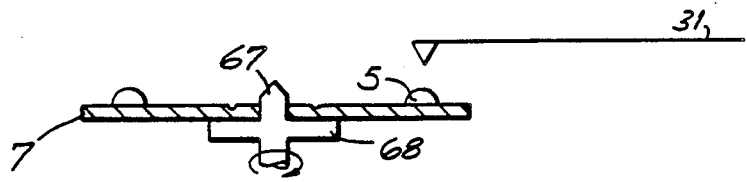
Figure 16E:
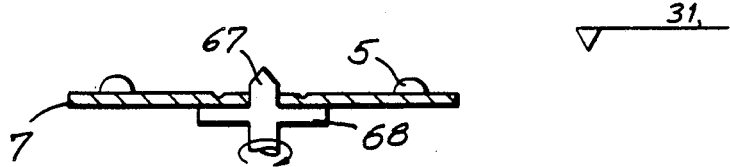

FIGS. 16A to 16E illustrate the steps which are used to apply adhesive in a ring shape to the upper surface of a substrate. FIG. 16A depicts a dispenser nozzle 31 moving horizontally to a predetermined position, to produce an adhesive ring having a diameter $D_2$. Turntable 68 is rotated, then nozzle 31 is lowered to a height δ above substrate 7 and adhesive 5 is dispensed as shown in FIG. 16B. δ should be between 0.02 and 5 mm. FIG. 16C illustrates adhesive 5 being dispensed while turntable 68 is rotated. After application of adhesive is completed, nozzle 31 is raised and then moved away horizontally (FIGS. 16D and 16E).

In an alternative embodiment, instead of the dispenser moving up, the turntable supporting the substrate could have been lowered. In either embodiment, the turntable should continue to rotate after adhesive is applied to improve the uniformity of the ring.

Figure 17:
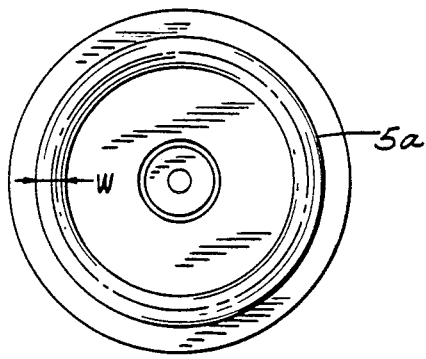
FIG. 17 is a top plan view of a substrate on which a single ring of adhesive is applied.
Figure 28:
FIGS. 28 through 30 are cross-sectional views of different types of optical recording media manufactured by the method of the present invention.

An adhesive with a viscosity between 2 and 1,000 cps was applied in this manner as shown in FIG. 17. Fluctuation of the width of the ring W, was 10% or less. FIG. 28 is a cross-sectional view of a disc which was constructed with adhesives having viscosities between 4 and 1,000 cps, in which the substrates were adhered under a vacuum. One hundred samples constructed in this manner were tested and adhesive did not squeeze out of these products.

Figure 18:
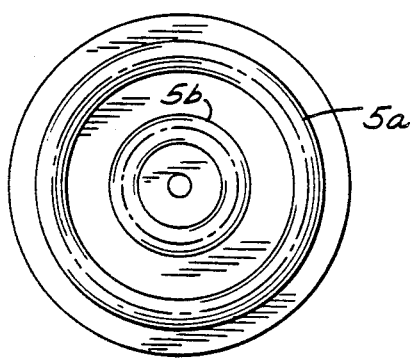
FIG. 18 is a top plan view of a substrate on which several rings of adhesive are applied.

FIG. 18 is a top plan view illustrating that two rings of adhesive 5a and 5b can be applied in concentric circles. When tested, adhesive did not squeeze out of the discs constructed in this manner.

Figure 19:
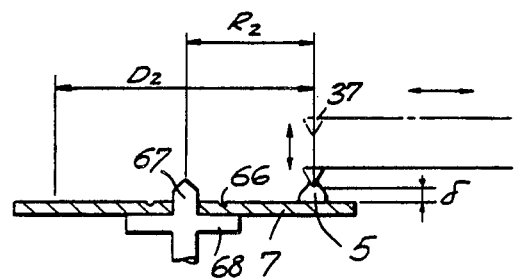
FIG. 19 is a cross-sectional view of a substrate positioned on a center boss illustrating the method of dispensing adhesive in a dotted pattern.
Figure 20:
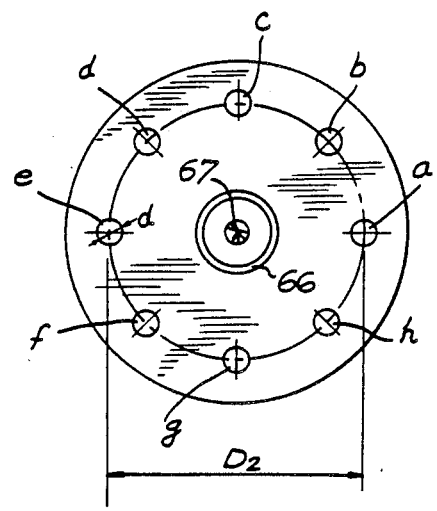
FIG. 20 is a top plan view of a substrate on which adhesive is applied in a dotted pattern.

FIG. 19 is a cross-sectional view illustrating a preferred way to apply adhesive 5 onto substrate 7 by the dot method. A dispenser nozzle 37 is moved horizontally and vertically in the same way as it is moved in FIGS. 16A through 16E. Dispenser nozzle 37 is moved horizontally until it is positioned a distance $R_2$ (½ of $D_2$) from center-boss 67. Dispenser nozzle 37 is then lowered until it is a distance δ above substrate 7. A globe or dot of adhesive 5 is applied to substrate 7. Dispenser 37 is then raised or, alternatively, the supporting turntable could have been lowered, then turntable 68 is rotated partially, and another dot of adhesive is applied in the same manner. This process is repeated until several dots of adhesive are applied to the substrate as is illustrated in FIG. 20.

Optical recording media were prepared with adhesive applied by the dot method. FIG. 20 is a top plan view of eight dots of adhesive on a disc shaped substrate. Generally, the more dots of adhesive applied, the better the quality of the resulting disc. The fluctuation of diameter d of each dot was 10% or less when the viscosity of the adhesive was between 2 and 1,000 cps. Dots of adhesive with viscosities of between 4 and 1,000 cps were applied to substrates which were then affixed to other substrates to form the discs. One hundred of such discs, which appear in cross-sectional view in FIG. 28 were tested. Adhesive did not squeeze out through the inner opening or out of the external edge of the joined substrates. This was also true when dots of adhesive were applied in a concentric ring shape.

Figure 29:
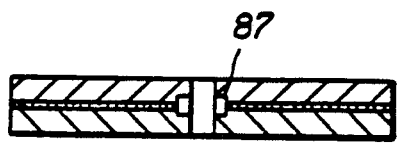
Figure 30:
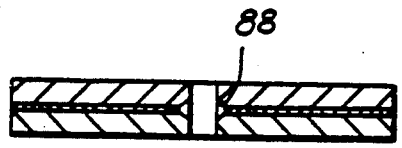
Figure 31:
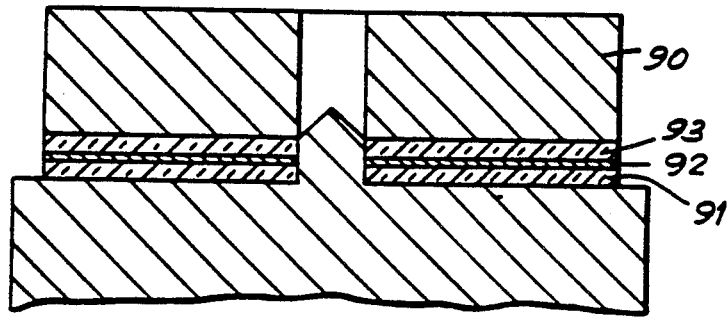
FIG. 31 is a cross-sectional view illustrating a prior art method for adhering substrates to form a conventional optical recording medium.
Figure 32:
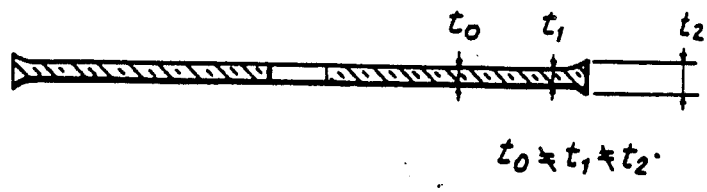
FIG. 32 is a cross-sectional view of an injection-molded plastic substrate.

FIG. 21 is a cross-sectional view illustrating that several dispenser nozzles 68a to 68h can be used at the same time to apply dots of adhesive in one operational step. FIG. 22 is a top plan view illustrating dots of adhesive 68ao to 68ho which can be applied one step if multiple nozzles are used. Dots of adhesive are applied to a lower substrate as shown in FIG. 22, and the upper substrate is adhered to the lower substrate under partial vacuum conditions. The results which were obtained were similar to the results obtained from the application method of FIGS. 19 and 20. Adhesive did not squeeze out of the outer edge of the ORM. The optical recording media produced for this example were shaped like the ORM shown in cross-section in FIG. 28. However, a disc with a different groove 87 as shown in FIG. 29 or a tapered edge 88 as shown in FIG. 30 can be prepared as well. The base substrates used to form discs with the structures shown in FIGS. 28 to 30 may be formed of PMMA, epoxy, TPX or glass, in addition to polycarbonate.

EXAMPLE 10

FIGS. 23A and 23B illustrate the spin coating method of applying adhesive. Substrate 7 is placed on a turntable 70 and rotated at a speed of 5 to 300 rpm. Adhesive 5 is applied through dispenser nozzle 71. Dispenser nozzle 71 is raised and the rotation speed is increased to about 2,000 to 4,000 rpm which spreads the adhesive outwardly. The substrate is spun until the adhesive spreads out to a thickness of 30 $\mu$m. At this point, the two substrates of the ORM are adhered under vacuum and exposed to UV rays as shown in FIGS. 5 and 6. Adhesives shown in Table 4 below can be used with a viscosity of 50 cps. The discs constructed in this manner have no practical problems although adhesive sometimes squeezed out of the outer edge of the disc.

EXAMPLE 11

Figure 24:
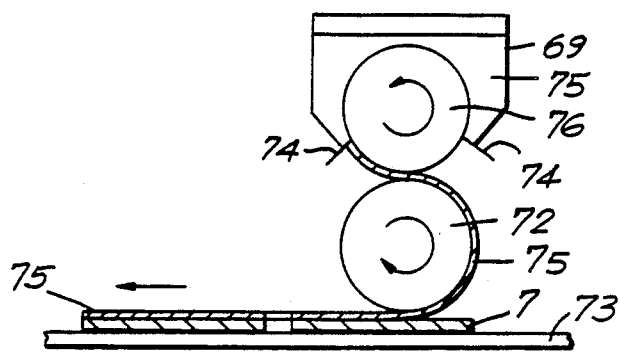
FIGS. 24 through 26 are schematic cross-sectional diagrams illustrating the roll coating method for applying adhesive.
Figure 25:
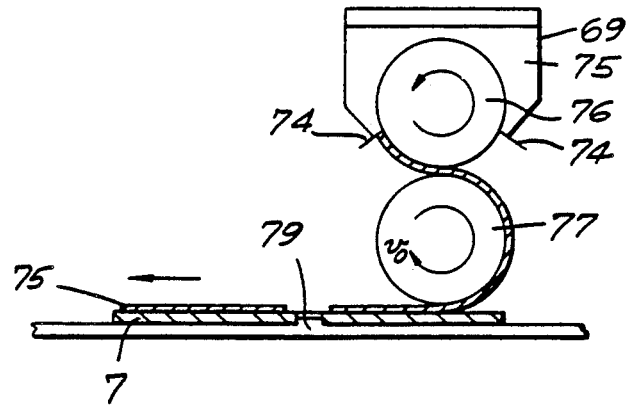
Figure 26:
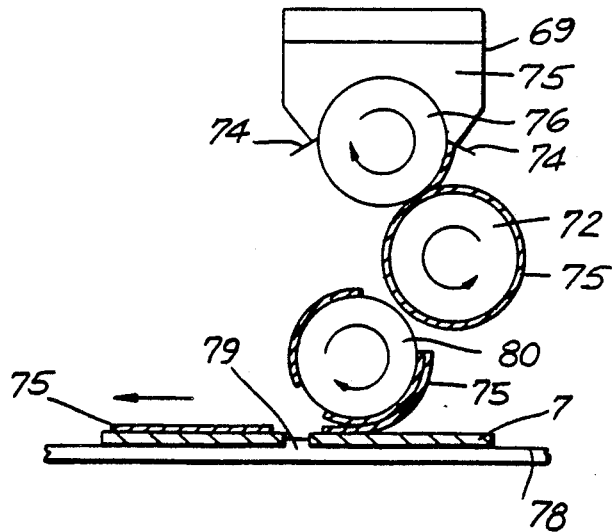

FIGS. 24, 25 and 26 are schematic diagrams of devices for applying the adhesive with a roller. In FIG. 24, an adhesive 75 is stored in a tank 69. Adhesives shown in Table 4 can be used. An upper roller 76 and a lower roller 72 both made of fluorine rubber are used to apply adhesive to the substrates. Substrate 7 is carried under the rollers by a belt 73. A blade 74 is placed near roller 76 to control the amount of adhesive which was transferred from roller 76 to roller 72. A roller with a diameter of 80 mm and a rotation speed of 60 rpm is used to apply adhesive with a thickness of 30 $\mu$m to substrates. The substrates are adhered under vacuum conditions as shown in FIG. 5 and exposed to UV rays as in FIG. 6. However, adhesive squeezed out from the external edge and through the center opening of the substrates and the discs which resulted were not satisfactory for practical use.

Adhesive was also applied to the substrates with an apparatus as shown in FIG. 25. This apparatus is similar to the apparatus shown in FIG. 24 except that lower roller 77 includes two surfaces. One surface was made of fluorine rubber and the other from silicon rubber. The fluorine rubber portion was donut shaped. The diameter of the center hole of the fluorine rubber surface was larger than the internal opening of the disc shaped substrate. The outer diameter of the fluorine rubber portion was smaller than the outer diameter of a disc shaped substrate. Fluorine rubber has very good wetting properties with adhesive 75 but silicon rubber has poor wetting properties. Therefore, adhesive 75 only adhered to the donut shaped fluorine rubber surface. The adhesive was applied on substrate 7 as shown in FIG. 25.

Adhesive with a thickness of 30 um was applied to substrate 7. Roller 77 has a circumferential speed of 0.01 m/sec. Belt 78 includes a boss 79 for carrying the substrate. Boss 79 also controls the rotating roller and a substrate in proper position. After adhesive was applied to the substrate, the other substrate portion was affixed under vacuum conditions and exposed to UV rays as shown in FIGS. 5 and 6. With this roller technique, adhesive did not squeeze out of the inner opening or out of the external edge of the ORM.

FIG. 26 illustrates a three roller apparatus for roll coating adhesive onto substrate 7. Roller 80 has a donut shaped convex portion. It is made from fluorine rubber which has good wetting properties with the adhesives listed in Table 4 below. The outer diameter of the donut shaped portion is smaller than the external diameter of substrate 7 but the diameter of the inner hole of the donut shaped portion is larger than the diameter of the internal opening of substrate 7.

An adhesive with a thickness of 30 $\mu$m is applied to the donut shaped pattern of roller 80 and is then applied to substrate 7 with the roller traveling at a surface circumferential speed of 0.03 m/sec. After the adhesive is applied to the surface of the substrate, both halves of the disc are adhered in a vacuum and exposed to UV rays as is shown in FIGS. 5 and 6. When this method of applying the adhesive was used, adhesive did not squeeze out of the inner opening or out of the external edge.

The surface speed of the roller should be between about 0.001 and about 5 m/sec. When the speed is faster than about 5 m/sec., air bubbles begin to mix with the adhesive which yields poor results. When the speed is slower than about 0.001 m/sec., adhesives of any viscosity will not adhere to the roller with stability. The viscosity of the adhesive which can be applied with this roller coating method is between about 0.5 and about 10,000 cps. However, to minimize the occurrence of air bubbles in the adhesive and to maximize the stability of the adhesive adhered to the roller, the viscosity of the adhesive should be between about 4 and about 1,000 cps.

EXAMPLE 12

Figure 27A:
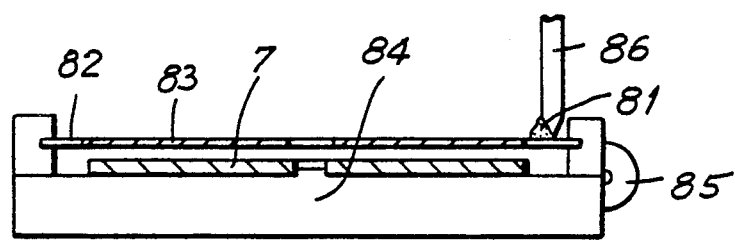
FIGS. 27A and 27B are schematic diagrams illustrating the screen printing method for applying adhesive.
Figure 27B:
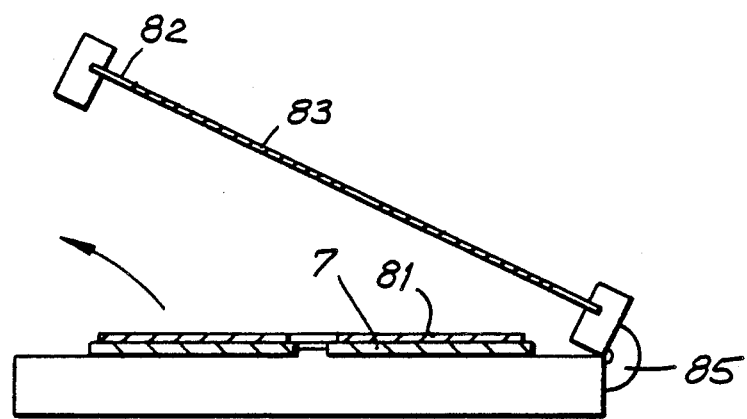

FIGS. 27A and 27B illustrate the screen printing method for applying adhesive. FIG. 27A shows how polyurethane squeegee 86 is used to apply the adhesives listed in Table 4 across a print screen 82. Substrate 7 is positioned by the center-boss of a holder 84. The print screen includes a donut shaped portion 83 corresponding to disc shaped substrate 7. Squeegee 86 spreads adhesive 81 across the print screen. Adhesive penetrates through the donut shaped portion. After adhesive 81 is applied through print screen 82, the print screen is lifted by rotating it about a hinge 85 and then substrate 7 is removed. The ratio of the penetrating portion of the print screen to the non-penetrating portion of the donut shaped portion was 3:7. The substrate can then be affixed to its other half under vacuum and exposed to UV rays as is shown in FIGS. 5 and 6, respectively. When this method of application is used, adhesive does not squeeze out of the center opening or out of the external edge of the ORM disc.

To use the screen printing method, the viscosity of the adhesive should be between 0.5 and 70,000 cps. When the viscosity of adhesive is 500 cps or more, it is necessary to increase the nonaeration properties of the adhesive by mixing silicon series antifoam agent with the adhesive. When the viscosity of the adhesive is 20 cps or less, the ratio of penetrating portion to non-penetrating portion becomes less than 3:7 on the donut shaped pattern.

Optical recording media constructed in accordance with the present invention exhibit many advantages over optical recording media produced by conventional methods. These improved optical recording media are characterized by a general lack of air bubbles in the adhesive layer or in the interface between the adhesive layer and the substrate. The virtual elimination of air bubbles eliminates the problems that these bubbles cause, such as: higher initial bit error rate, deterioration in bit error rate when using transmitted light, cracks in the dielectric layer which increase bit error rate when information is read using transmitted or reflected light and refraction and reflection of laser beams. The elimination of bubbles permits uniform conduction of heat generated by laser beams to the recording layer. This yields stable bits on the recording layer for stable recording of information.

The low pressures used to force the substrates together also improve the characteristics of optical recording media produced by the method of the invention. The products exhibit substantially less localized birefringence than optical recording media produced by conventional methods. They also have a smoother more even surface. Additionally, destruction of the brittle region of a recording layer or a dielectric layer near to pinholes on an information recording layer is prevented by the reduction in the force pressing the substrates together during adherence.

The optical recording media produced under the improved method of the invention are further characterized by a minimal warp and deflection. In fact, such products have about 50% less warp and deflection than a single substrate alone.

Using substrates with grooves prevents adhesive from coming out of the inner opening or external edge of the disc. This not only increases the yield of optical recording media but the products have greater reliability as well.

Accordingly the optical recording media produced by the method of the present invention shows improvements in yield, accuracy and reliability.

TABLE 1

Formulations of ultraviolet curing adhesive

IRGACURE 651: photoinitiator
(produced by CIBA-GEIGY LIM.)
HDDA: hexanediol diacrylate
TMPTA: trimethylol propane triacrylate
NPGDA: neopenthylglycol diacrylate
TPGDA: tripropylenegrycol diacrylate
THFA: tetrahydrofurfryl acrylate

|  | ① | ② | ③ | ④ |
|---|---|---|---|---|
| initiator | IRGACURE 651 (4%) | ← | ← | ← |
| sensitizing agent | — | — | TRIETHYL-AMINE (1%) | — |
| acrylate monomer | HDDA (80%) TMPTA (16%) | HDDA (40%) NPGDA (40%) TMPTA (16%) | HDDA (80%) TMPTA (10%) TPGDA (5%) | THFA (80%) TMPTA (16%) |

Formulation No. 1 is used as an adhesive for Examples 1, 2 and 3.

TABLE 2

Product quality with different adhesive viscosities and affixing pressures

| Viscosity of adhesive (cps) | weight for pressure (kg/cm²) | | | | |
|---|---|---|---|---|---|
|  | substrate's own weight | 0.5 | 1 | 5 | 10 |
| 1 | OK | NG$^A$ | NG$^A$ | NG$^{AC}$ | NG$^{AC}$ |
| 4 | OK | OK | OK | NG$^{AC}$ | NG$^{AC}$ |
| 50 | OK | OK | OK | NG$^{AC}$ | NG$^{AC}$ |
| 100 | OK | OK | OK | NG$^{AC}$ | NG$^{AC}$ |
| 1000 | OK | OK | OK | NG$^{AC}$ | NG$^{AC}$ |
| 5000 | NG$^B$ | NG$^B$ | NG$^B$ | NG$^{BC}$ | NG$^{BC}$ |
| 10000 | NG$^B$ | NG$^B$ | NG$^B$ | NG$^{BC}$ | NG$^{BC}$ |

NG$^A$: adhesive squeezes out to internal or external peripheries or adhesive is not enough to fill.
NG$^B$: air bubbles mix with the adhesive layer
NG$^C$: pinhole portions near to the recording layer of substrate is destroyed.

TABLE 3

Product quality with different types of adhesive and adhesive viscosities

| viscosity adhesive (cps) | The kind of adhesive | | | | |
|---|---|---|---|---|---|
|  | UV curing type | cyano acrylate series | two-pack curing series | two-pack urethane series | anaerobic curing type |
| 1 | OK | — | — | — | — |
| 4 | OK | OK | — | — | — |
| 50 | OK | OK | — | — | OK |
| 100 | OK | OK | — | — | OK |
| 1000 | OK | — | OK | OK | OK |
| 5000 | NG$^B$ | — | NG$^B$ | NG$^B$ | — |
| 10000 | NG$^B$ | — | NG$^B$ | NG$^B$ | — |

NG: air bubbles mix with the adhesive layer

TABLE 4

Formulations of ultraviolet curing adhesive

| | Formulation Nos. | | | | | | |
|---|---|---|---|---|---|---|---|
| | 1 | 2 | 3 | 4 | 5 | 6 | 7 |
| viscosity (cps) | 1.5 | 4 | 50 | 100 | 1000 | 5000 | 10000 |
| formulation | IRGARCURE 907 (5%) | ← | ← | ← | ← | ← | ← |
| acrylate monomer | 2-MTA (95%) | HDDA (95%) | HDDA (30%) | TMPTA (95%) | DPHA (50%) | DPHA (95%) | M-7100 (95%) |

TABLE 4-continued

| | Formulations of ultraviolet curing adhesive | | | | | | |
|---|---|---|---|---|---|---|---|
| | Formulation Nos. | | | | | | |
| | 1 | 2 | 3 | 4 | 5 | 6 | 7 |
| oligomer | | | TMPTA (65%) | | TMPTA (45%) | | |

IRGARCURE 907: photoinitiator produced by CHIBA-GEIGY LIM.
2-MTA: acrylic acid 2-methoxyl ethyl
DPHA: acrylate monomer produced by NIPPON KAYAKU Co., Ltd
M-7100: origo ester acrylate produced by TOA GOSEI CHEMICAL INDUSTRY Co., LTD.

TABLE 5

| Sample No. | Anaerobic adhesive Viscosity (cps) | |
|---|---|---|
| 3066 | 230 | UV adhesive with anaerobic properties |
| 3067 | 600 | the same as above |
| 1322 | 150 | anaerobic adhesive |
| 1324 | 600 | the same as above |
| 1375B | 850 | the same as above |

Sample Nos. show the product No. of Three Bond K.K.

It will thus be seen that the objects set forth above, among those made apparent from the preceding description, are efficiently attained and, since certain changes may be made in carrying out the above method and in the article set forth without departing from the spirit and scope of the invention, it is intended that all matter contained in the above description and shown in the accompanying drawings shall be interpreted as illustrative and not in a limiting sense.

It is also to be understood that the following claims are intended to cover all of the generic and specific features of the invention herein described and all statements of the scope of the invention which, as a matter of language, might be said to fall therebetween.

What is claimed is:

1. A method of manufacturing an optical recording medium using a first substrate having a first surface formed as the surface of a layer of dielectric material and a second substrate having a second surface facing said first surface of said first substrate, at least one of said first and second substrates including an information recording layer proximate the respective first and second surfaces thereof, comprising the steps of selectively applying an adhesive material to said first surface of said first substrate in a ring shaped pattern so that adhesive will properly wet the surface of the substrates, creating a partial vacuum of between about 30 torr and $5 \times 10^{-3}$ torr around said first and second substrates, and positioning said second surface of said second substrate adjacent said first surface of said first substrate with said adhesive material therebetween and pressing the substrates together with a force no greater than about the weight of one of the first and second substrates to adhere said first and second substrates together to form said optical recording medium.

2. The method of manufacturing an optical recording medium as claimed in claim 1, wherein the viscosity of said adhesive material is between about 4 and 1,000 cps.

3. The method of manufacturing an optical recording medium as claimed in claim 1, wherein the dielectric material is selected from the group consisting of aluminum nitride, silicon nitride and combinations thereof.

4. The method of manufacturing an optical recording medium as claimed in claim 1, wherein said ring shaped pattern is formed of dots of adhesive.

5. The method of manufacturing an optical recording medium as claimed in claim 2, wherein said ring shaped pattern is formed of dots of adhesive.

6. The method of manufacturing an optical recording medium as claimed in claim 1, wherein said first substrate is rotated while said adhesive material is applied to the first surface thereof.

7. The method of manufacturing an optical recording medium as claimed in claim 1, wherein said adhesive material is applied to said first surface under partial vacuum conditions.

8. The method of manufacturing an optical recording medium as claimed in claim 2, wherein said adhesive material is applied to said first surface under partial vacuum conditions.

9. The method of manufacturing an optical recording medium as claimed in claim 5 wherein said adhesive material is applied to said first surface under partial vacuum conditions.

10. The method of manufacturing an optical recording medium as claimed in claim 4, wherein said adhesive material is applied to said first surface under partial vacuum conditions.

11. The method of manufacturing an optical recording medium as claimed in claim 1, wherein said adhesive material is applied to the one of the first and second substrates which includes said information recording layer.

12. The method of manufacturing an optical recording medium as claimed in claim 2, wherein said adhesive material is applied to the one of the first and second substrates which includes said information recording layer.

13. The method of manufacturing an optical recording medium as claimed in claim 1, wherein said first substrate includes said information recording layer and the dielectric material is selected from the group consisting of aluminum nitride, silicon nitride and combinations thereof.

14. The method of manufacturing an optical recording medium as claimed in claim 4, wherein said adhesive material is applied to the one of the first and second substrates which includes said information recording layer.

15. The method of manufacturing an optical recording medium as claimed in claim 1, wherein said adhesive material is a type which is cured by exposure to ultraviolet rays and further comprising the step of exposing said adhesive material to ultraviolet rays to cure said adhesive material.

16. The method of manufacturing an optical recording medium as claimed in claim 4, wherein said adhesive material is a type which is cured by exposure to ultraviolet rays and further comprising the step of exposing said adhesive material to ultraviolet rays to cure said adhesive material.

17. The method of manufacturing an optical recording medium as claimed in claim 2, wherein said adhesive material is a type which is cured by exposure to ultraviolet rays and further comprising the step of exposing said adhesive material to ultraviolet rays to cure said adhesive material.

18. The method of manufacturing an optical recording medium as claimed in claim 5, wherein said adhesive material is a type which is cured by exposure to ultraviolet rays and further comprising the step of exposing said adhesive material to ultraviolet rays to cure said adhesive material.

19. The method of manufacturing an optical recording medium as claimed in claim 7, wherein said adhesive material is a type which is cured by exposure to ultraviolet rays and further comprising the step of exposing said adhesive material to ultraviolet rays to cure said adhesive material.

20. The method of manufacturing an optical recording medium as claimed in claim 9, wherein said adhesive material is a type which is cured by exposure to ultraviolet rays and further comprising the step of exposing said adhesive material to ultraviolet rays to cure said adhesive material.

21. The method of manufacturing an optical recording medium as claimed in claim 1, wherein said adhesive material is selected from the group consisting of cyanoacrylate series adhesive, two-pack type epoxy adhesive, two-pack type urethane adhesive, anaerobic curing type adhesive and radical polymerization type adhesive.

22. The method of manufacturing an optical recording medium as claimed in claim 21, wherein said adhesive material is applied to said first surface under partial vacuum conditions.

23. The method of manufacturing an optical recording medium as claimed in claim 2, wherein said adhesive material is an ultraviolet curing type adhesive, said adhesive material being applied to said first surface while ultraviolet rays are directed thereto.

24. The method of manufacturing an optical recording medium as claimed in claim 1, wherein the fluctuation of the width of the ring of adhesive material is 25% or less along the length of the ring and the ratio of the diameter of the ring of adhesive material to the diameter of said first substrate is greater than or equal to 0.6, said ring being discontinuous, and the angle formed by the point at the beginning of the discontinuity of the ring of adhesive material, the point at the center of the first substrate as a vertex and the point at the end of the discontinuity of the ring of adhesive material is about 25° or less.

25. The method of manufacturing an optical recording medium as claimed in claim 2, wherein the fluctuation of the width of the ring of adhesive material is 25% or less along the length of the ring and the ratio of the diameter of the ring of adhesive material to the diameter of said first substrate is greater than or equal to 0.6, said ring being discontinuous, and the angle formed by the point at the beginning of the discontinuity of the ring of adhesive material, the point at the center of the first substrate as a vertex and the point at the end of the discontinuity of the ring of adhesive material is about 25° or less.

26. The method of manufacturing an optical recording medium as claimed in claim 7, wherein the fluctuation of the width of the ring of adhesive material is 25% or less along the length of the ring and the ratio of the diameter of the ring of adhesive material to the diameter of said first substrate is greater than or equal to 0.6, said ring being discontinuous, and the angle formed by the point at the beginning of the discontinuity of the ring of adhesive material, the point at the center of the first substrate as a vertex and the point at the end of the discontinuity of the ring of adhesive material is about 25° or less.

27. The method of manufacturing an optical recording medium as claimed in claim 1, wherein said adhesive material is applied by a dispenser nozzle having a tip, the distance between the tip of said dispenser nozzle and said first surface of said first substrate being between about 0.02 and 5 mm while said adhesive material is applied thereto, said tip of said dispenser nozzle contacting said adhesive material while said adhesive material is applied to said first substrate, said dispenser nozzle and said first substrate being separated after application of said adhesive material.

28. The method of manufacturing an optical recording medium as claimed in claim 2, wherein said adhesive material is applied by a dispenser nozzle having a tip, the distance between the tip of said dispenser nozzle and said first surface of said first substrate being between about 0.02 and 5 mm while said adhesive material is applied thereto, said tip of said dispenser nozzle contacting said adhesive material while said adhesive material is applied to said first substrate, said dispenser nozzle and said first substrate being separated after application of said adhesive material.

29. The method of manufacturing an optical recording medium as claimed in claim 1, wherein said first substrate is supported by a turntable which is rotated while said adhesive material is applied, said turntable being moved in a vertical direction after application of said adhesive material.

30. The method of manufacturing an optical recording medium as claimed in claim 13, wherein said first substrate is supported by a turntable which is rotated while said adhesive material is applied, said turntable being moved in a vertical direction after application of said adhesive material.

31. The method of manufacturing an optical recording medium as claimed in claim 1, wherein concentric rings of adhesive material are applied to said first substrate.

32. The method of manufacturing an optical recording medium as claimed in claim 1, wherein said adhesive material is applied by plurality of dispenser nozzles.

33. The method of manufacturing an optical recording medium as claimed in claim 15, wherein the energy of irradiation is about 100 mj/cm$^2$ or more.

* * * * *